US012258427B2

(12) United States Patent
White et al.

(10) Patent No.: US 12,258,427 B2
(45) Date of Patent: Mar. 25, 2025

(54) PROCESSES FOR INCREASING THE MOLECULAR WEIGHT OF GUAYULE NATURAL RUBBER

(71) Applicant: Bridgestone Corporation, Chuo-ku (JP)

(72) Inventors: Robert W. White, Gilbert, AZ (US); Michael R. Hartzell, Gold Canyon, AZ (US)

(73) Assignee: Bridgestone Corporation, Chuo-ku (JP)

( * ) Notice: Subject to any disclaimer, the term of this patent is extended or adjusted under 35 U.S.C. 154(b) by 848 days.

(21) Appl. No.: 17/415,609

(22) PCT Filed: Dec. 19, 2019

(86) PCT No.: PCT/US2019/067461
§ 371 (c)(1),
(2) Date: Jun. 17, 2021

(87) PCT Pub. No.: WO2020/132236
PCT Pub. Date: Jun. 25, 2020

(65) Prior Publication Data
US 2022/0064339 A1    Mar. 3, 2022

Related U.S. Application Data

(60) Provisional application No. 62/783,232, filed on Dec. 21, 2018.

(51) Int. Cl.
| | |
|---|---|
| C08C 2/06 | (2006.01) |
| C08C 1/065 | (2006.01) |
| C08C 2/00 | (2006.01) |
| C08C 4/00 | (2006.01) |

(52) U.S. Cl.
CPC ............... *C08C 1/065* (2013.01); *C08C 2/00* (2013.01); *C08C 2/06* (2013.01); *C08C 4/00* (2013.01)

(58) Field of Classification Search
None
See application file for complete search history.

(56) References Cited

U.S. PATENT DOCUMENTS

| | | |
|---|---|---|
| 702,678 A | 6/1902 | Prampolini |
| 741,258 A | 10/1903 | Lawrence |
| 814,407 A | 3/1906 | Von Stechow |
| 843,567 A | 2/1907 | Bradshaw |
| 957,495 A | 5/1910 | Chute et al. |
| 979,902 A | 9/1910 | Van der Linde |
| 999,708 A | 8/1911 | Ellis |
| 1,051,987 A | 2/1913 | Chute |
| 1,103,903 A | 7/1914 | Kendall |
| 1,105,568 A | 7/1914 | Kendall |
| 1,135,236 A | 4/1915 | Wheeler et al. |
| 1,161,135 A | 11/1915 | Kaminski et al. |
| 1,242,886 A | 10/1917 | Meyer |
| 1,247,814 A | 11/1917 | Garza |
| 1,550,319 A | 8/1925 | Hopkinson |
| 1,671,570 A | 5/1928 | Carnahan |
| 1,695,676 A | 12/1928 | Yeandle |
| 1,740,079 A | 12/1929 | Edison |
| 1,753,184 A | 4/1930 | Spence |
| 1,753,185 A | 4/1930 | Spence |
| 1,829,502 A | 10/1931 | Calcott et al. |
| 1,903,500 A | 4/1933 | Calcott |
| 2,138,895 A | 12/1938 | Wiezevich |
| 2,281,336 A | 4/1942 | Stacom |
| 2,339,418 A | 1/1944 | McKay |
| 2,364,394 A | 12/1944 | Sibley |
| 2,373,689 A | 4/1945 | Kenda |
| 2,387,521 A | 10/1945 | Martin |
| 2,390,860 A | 12/1945 | Williams |
| 2,399,156 A | 4/1946 | Stamberger et al. |
| 2,408,853 A | 10/1946 | Hoover et al. |
| 2,410,780 A | 11/1946 | Gracia |
| 2,410,781 A | 11/1946 | Gracia |
| 2,434,412 A | 1/1948 | Jones |
| 2,459,369 A | 1/1949 | Tint et al. |
| 2,475,141 A | 7/1949 | Jones |
| 2,549,763 A | 4/1951 | Banigan, Jr. et al. |
| 2,618,670 A | 11/1952 | Clark |
| 2,665,317 A | 1/1954 | Clark et al. |
| 2,744,125 A | 5/1956 | Meeks et al. |
| 3,311,601 A | 3/1967 | Conley |
| 3,376,158 A | 4/1968 | Buser |

(Continued)

FOREIGN PATENT DOCUMENTS

| | | |
|---|---|---|
| AU | 2012202924 A | 5/1942 |
| CN | 101906176 A | 12/2010 |

(Continued)

OTHER PUBLICATIONS

Mark; Encyclopedia of Polymer Science and Technology vol. 11 4th Edition (2014) pp. 670-698. (Year: 2014).*
Kim, Dong Seok, International Search Report with Written Opinion from PCT/US2013/046328, 12 pp. (Oct. 11, 2013).
Abstract—Week 200365 Thomson Scientific, London, GB; AN 2003-682828; XP000002567182, JP 2003 040902 A (Nitto Denko Corp) (dated Feb. 13, 2003).
Adler, R.J., et al., Freeze Coagulation of BAS Latex, Ind. Eng. Chem. Res. vol. 36 pp. 2156-2162 (dated 1997).
Bedane, G.M., et al., Development and Evaluation of a Guayule Debarker, Industrial Crops and Products, vol. 34, pp. 1256-1261 (2011).
Beintema, Nienke, Rubber From Dandelions and Shrubs, Wageningen World, No. 1, pp. 16-17, 2012.

(Continued)

*Primary Examiner* — David J Buttner
(74) *Attorney, Agent, or Firm* — Meredith E. Hooker; Jenny L. Sheaffer

(57) ABSTRACT

Disclosed herein are process for increasing the molecular weight of guayule natural rubber that is solubilized in an organic solvent solution. The processes utilize shear desolventizing to achieve the increase in molecular weight.

21 Claims, No Drawings

(56) References Cited

U.S. PATENT DOCUMENTS

| | | | |
|---|---|---|---|
| 3,683,511 A * | 8/1972 | Johnson | C08C 2/06 528/502 F |
| 4,122,012 A | 10/1978 | Blasnik | |
| 4,136,131 A | 1/1979 | Buchanan | |
| 4,159,903 A | 7/1979 | Bauman | |
| 4,243,561 A | 1/1981 | Lal et al. | |
| 4,246,001 A | 1/1981 | Bauman | |
| 4,269,242 A | 5/1981 | Smith | |
| 4,272,436 A | 6/1981 | Lal et al. | |
| 4,376,189 A | 3/1983 | Trivette | |
| 4,376,853 A | 3/1983 | Gutierrez et al. | |
| 4,405,532 A | 9/1983 | Gutierrez et al. | |
| 4,410,656 A | 10/1983 | Coran et al. | |
| 4,412,031 A | 10/1983 | Kitahara et al. | |
| 4,412,041 A | 10/1983 | Kitahura et al. | |
| 4,424,171 A | 1/1984 | Gutierrez et al. | |
| 4,433,114 A | 2/1984 | Coran et al. | |
| 4,434,266 A | 2/1984 | Trivette, Jr. | |
| 4,435,337 A | 3/1984 | Kay et al. | |
| 4,493,925 A | 1/1985 | Trivette, Jr. | |
| 4,496,683 A | 1/1985 | Morita | |
| 4,513,110 A | 4/1985 | Rader | |
| 4,525,541 A | 6/1985 | Kitahara et al. | |
| 4,526,929 A | 7/1985 | Kishida et al. | |
| 4,526,959 A | 7/1985 | Kay et al. | |
| 4,530,995 A | 7/1985 | Gutierrez et al. | |
| 4,542,191 A | 9/1985 | Kay et al. | |
| 4,559,378 A | 12/1985 | Kay et al. | |
| 4,568,711 A | 2/1986 | Kay et al. | |
| 4,585,826 A | 4/1986 | Graves | |
| 4,591,631 A | 5/1986 | Beattie | |
| 4,591,632 A | 5/1986 | Moore | |
| 4,609,336 A | 9/1986 | Stevenson et al. | |
| 4,616,068 A | 10/1986 | Schloman et al. | |
| 4,616,075 A | 10/1986 | Malani et al. | |
| 4,621,118 A | 11/1986 | Schloman, Jr. et al. | |
| 4,622,365 A | 11/1986 | Schloman et al. | |
| 4,623,713 A | 11/1986 | Beinor et al. | |
| 4,638,028 A | 1/1987 | Lui et al. | |
| 4,647,607 A | 3/1987 | Kay et al. | |
| 4,677,153 A | 6/1987 | Kitahara et al. | |
| 4,678,860 A | 7/1987 | Kuester | |
| 4,681,929 A | 7/1987 | Cole et al. | |
| 4,684,715 A | 8/1987 | Kay et al. | |
| 4,739,037 A | 4/1988 | Kay | |
| 4,739,038 A | 4/1988 | Schloman, Jr. | |
| 4,786,683 A | 11/1988 | Schloman, Jr. et al. | |
| 4,792,583 A | 12/1988 | Coran | |
| 4,804,741 A | 2/1989 | Verbiscar et al. | |
| 4,829,117 A | 5/1989 | Schloman et al. | |
| 4,988,388 A | 1/1991 | Schloman, Jr. | |
| 5,247,009 A | 9/1993 | Kitahara | |
| 5,321,111 A | 6/1994 | Ji | |
| 5,473,024 A | 12/1995 | Thames et al. | |
| 5,580,942 A | 12/1996 | Cornish | |
| 5,599,868 A | 2/1997 | Bohm et al. | |
| 5,717,050 A | 2/1998 | Cornish | |
| 5,872,186 A | 2/1999 | Ang | |
| 5,998,512 A | 12/1999 | Schloman | |
| 6,014,998 A | 1/2000 | Mowdood | |
| 6,054,525 A | 4/2000 | Schloman et al. | |
| 6,132,711 A | 10/2000 | Backhaus et al. | |
| 6,399,673 B1 | 6/2002 | Thames et al. | |
| 6,492,447 B2 | 12/2002 | Chestnut et al. | |
| 6,787,590 B2 | 9/2004 | Nakayama et al. | |
| 7,259,231 B2 | 8/2007 | Cornish et al. | |
| 7,540,438 B2 | 6/2009 | Buranov | |
| 7,629,397 B2 | 12/2009 | McDonald et al. | |
| 7,790,036 B2 | 9/2010 | Cornish et al. | |
| 7,923,039 B2 | 4/2011 | Cornish et al. | |
| 8,013,213 B2 | 9/2011 | Mau et al. | |
| 8,241,873 B2 | 8/2012 | Diner et al. | |
| 8,268,121 B2 | 9/2012 | Blount | |
| 8,815,965 B2 | 8/2014 | Cole et al. | |
| 9,138,660 B2 | 9/2015 | Yahamoto | |
| 9,315,589 B2 | 4/2016 | Huang et al. | |
| 9,546,224 B2 | 1/2017 | Cole et al. | |
| 9,562,720 B2 | 2/2017 | Huang et al. | |
| 9,567,457 B2 | 2/2017 | Huang et al. | |
| 9,611,334 B2 | 4/2017 | Huang et al. | |
| 9,637,562 B2 | 5/2017 | Huang et al. | |
| 9,890,262 B2 | 2/2018 | Huang et al. | |
| 10,023,660 B2 | 7/2018 | Randall et al. | |
| 10,113,011 B2 | 10/2018 | Cole et al. | |
| 10,132,563 B2 | 11/2018 | Huang et al. | |
| 10,138,304 B2 | 11/2018 | Huang et al. | |
| 10,287,367 B2 | 5/2019 | Huang et al. | |
| 10,316,110 B2 | 6/2019 | Huang et al. | |
| 10,471,473 B2 | 11/2019 | Huang et al. | |
| 10,626,194 B2 | 4/2020 | Huang et al. | |
| 11,028,188 B2 | 6/2021 | Huang et al. | |
| 11,267,019 B2 | 3/2022 | Huang et al. | |
| 11,396,560 B2 | 7/2022 | Huang et al. | |
| 11,834,526 B2 | 12/2023 | Huang et al. | |
| 2002/0006987 A1 | 1/2002 | Nakayama | |
| 2004/0265343 A1 | 12/2004 | Hill | |
| 2006/0106183 A1 | 5/2006 | Cornish et al. | |
| 2006/0149015 A1 | 7/2006 | Cornish et al. | |
| 2006/0225144 A1 | 10/2006 | Hallahan et al. | |
| 2007/0265408 A1 | 11/2007 | Cornish et al. | |
| 2007/0276112 A1 | 11/2007 | Buranov | |
| 2008/0015336 A1 | 1/2008 | Cornish et al. | |
| 2008/0221246 A1 | 9/2008 | Imam et al. | |
| 2008/0300526 A1 | 12/2008 | Gumbs | |
| 2009/0054595 A1 | 2/2009 | Cornish et al. | |
| 2009/0099309 A1 | 4/2009 | Gumbs | |
| 2009/0099327 A1 | 4/2009 | Cornish et al. | |
| 2009/0163689 A1 | 6/2009 | Cornish et al. | |
| 2009/0191243 A9 | 7/2009 | Hill et al. | |
| 2010/0210745 A1 | 8/2010 | McDaniel et al. | |
| 2011/0021743 A1 | 1/2011 | Cornish et al. | |
| 2011/0054051 A1 | 11/2011 | Cole et al. | |
| 2011/0275142 A1 | 11/2011 | Wade et al. | |
| 2012/0063969 A1 | 3/2012 | Cornish et al. | |
| 2014/0288255 A1 * | 9/2014 | Martin | C08C 2/02 526/340.4 |
| 2014/0336288 A1 | 11/2014 | Cole et al. | |
| 2015/0018459 A1 | 1/2015 | Huang et al. | |
| 2015/0073113 A1 | 3/2015 | Huang et al. | |
| 2015/0126673 A1 | 5/2015 | Randall et al. | |
| 2015/0136882 A1 | 5/2015 | Huang et al. | |
| 2015/0184933 A1 | 7/2015 | Huang et al. | |
| 2015/0190848 A1 | 7/2015 | Huang et al. | |
| 2017/0081429 A1 | 5/2017 | Cole et al. | |
| 2017/0146291 A1 | 5/2017 | Huang et al. | |
| 2017/0152326 A1 | 6/2017 | Huang et al. | |
| 2017/0226309 A1 | 8/2017 | Huang et al. | |
| 2017/0252671 A1 | 9/2017 | White et al. | |
| 2018/0086854 A1 | 3/2018 | Amor et al. | |
| 2019/0284309 A1 | 9/2019 | Huang et al. | |
| 2022/0356273 A1 | 11/2022 | Huang et al. | |

FOREIGN PATENT DOCUMENTS

| | | |
|---|---|---|
| EP | 100434 A2 | 2/1984 |
| EP | 164137 A2 | 12/1985 |
| EP | 0039910 B1 | 4/1987 |
| EP | 100434 B1 | 9/1989 |
| EP | 164137 B1 | 6/1990 |
| EP | 476641 B1 | 3/1992 |
| EP | 491229 B1 | 6/1992 |
| EP | 2183303 A1 | 5/2010 |
| EP | 1969036 B1 | 3/2011 |
| GB | 545410 A | 5/1942 |
| GB | 2116985 A | 10/1983 |
| GB | 2164341 A | 3/1986 |
| GB | 2174403 A | 11/1986 |
| JP | S61-264005 A | 11/1986 |
| JP | 62000502 A | 1/1987 |
| JP | H06-100704 A | 4/1994 |
| JP | H08-283309 A | 10/1996 |
| JP | H11-012306 A | 1/1999 |
| JP | 2003-040902 A | 2/2003 |
| JP | 2003-313366 A | 11/2003 |

(56) References Cited

FOREIGN PATENT DOCUMENTS

| | | |
|---|---|---|
| JP | 2006348607 A | 12/2006 |
| JP | 2007-126676 A | 5/2007 |
| RU | 2027746 C1 | 1/1995 |
| SU | 15590 A1 | 6/1930 |
| SU | 47819 A1 | 7/1936 |
| SU | 47820 A1 | 7/1936 |
| SU | 50447 A1 | 11/1936 |
| SU | 66332 A1 | 11/1945 |
| SU | 68448 A1 | 11/1946 |
| SU | 72175 A1 | 11/1947 |
| SU | 1131883 A1 | 12/1984 |
| WO | 1981003255 A1 | 11/1981 |
| WO | 9803255 A1 | 1/1998 |
| WO | 2001049257 A1 | 7/2001 |
| WO | 2007/136364 A1 | 11/2007 |
| WO | 2009129249 A2 | 10/2009 |
| WO | 2013134429 A1 | 9/2013 |
| WO | 2013134430 A1 | 9/2013 |
| WO | 2013173625 A1 | 11/2013 |
| WO | 2013192182 A1 | 12/2013 |
| WO | 2013192217 A1 | 12/2013 |
| WO | 2013192227 A1 | 12/2013 |
| WO | 2015038707 A1 | 3/2015 |
| WO | 2017/103769 A1 | 6/2017 |
| WO | 2017/103775 A1 | 6/2017 |
| WO | 2017/103782 A1 | 6/2017 |
| WO | 2017/165499 A1 | 9/2017 |
| WO | 2017/176686 A1 | 10/2017 |

OTHER PUBLICATIONS

Belmares, H. et al., New Rubber Peptizers and Coatings Derived from Guayule Resin, Industrial and Engineering Chemistry: Product Research and Development, vol. 19, pp. 107-111 (1980).
Bhowmick, et al. Effect of Resin Components on the Degradation of Guayule Rubber, Journal of Applied Polymer Science, vol. 30, pp. 2367-2388 (dated 1985).
Buranov, Anvar U., et al., Extraction and Characterization of Latex and Natural Rubber from Rubber-Bearing Plants, J. Agric. Food Chem. 2010, 58, 734-743.
Buranov, Anvar, et al., "Rubber-Bearing Plants of Central Asia," Conf. Title Industrial Crops and Rural Development, Conf. date Sep. 17, 2005.
Cataldo, F. Guayule Rubber: A New Possible World Scenario for the Production of Natural Rubber Progress in Rubber and Plastics Technology, vol. 16, No. 1 (dated 2000).
Centrifugation and Centrifuges, Lenntech, accessed Dec. 6, 2011 at http://www.lenntech.com/library/clarification/centrifugation.htm.
Chang, M., and G.T. Tsao. Hydrolysis of Guayule Cellulose for Alcohol Production. E.C. Gregg, J.L. Tipton and H.T. Huang, ends., Proceedings of the Third International Guayule Conference, Pasadena, Calif., Guayule Rubber Soc.: Riverside, Calif., pp. 211-224 (1983).
Crown Model IV and Model V Extractors, Flyer, Crown Iron Works Company, accessed Jul. 30, 2015 at http://www.crowniron.com/userfiles/image/specialty%20extractor%20insert1.pdf (dated Nov. 2006).
Curtis, Jr., "Distribution of Rubber and Resins in Guayule", Plance Physiology, vol. 22, No. 4, pp. 333-359 (dated Oct. 1947).
Decanters from GEA Westfalia Separator, Mechanical Separation, GE Westfalia Separator, www.westfaliaseparator.com (2010).
Doering, "Guayule Rubber in Tires and Tubes, Service Tests in Which the Rubber was Exclusively Guayule", Industrial and Engineering Chemistry, vol. 26, No. 5, pp. 541-543, (dated May 1934).
Extraction Decanters from GEA Westfalia Separator, GEA Westfalia Separator Group, accessed May 30, 2012 at http://www.westfalia-separator.com/products/decanters/extraction-decanters.html.
Gelling, I.R. Modification of Natural Rubber Latex With Peracetic Acid. Rubber and Technology. bo. 58, pp. 86-96. (1985).
Himayah H. Naqvi and George P. Hanson; American Journal of Botany, vol. 69, No. 6 (Jul. 1982) pp. 985-989; Germination and Growth Inhibitors in Guayule (*Parthenium argentatum Gray*) Chaff and Their Possible Influence in Seed Dormancy.
Keller, B.A., editor, Rubber and Rubber-Plants (book), pp. 408-410, published 1936.
Keller. R.W., D.S. Winkler, and H.L. Stephens. Degradative Effects of Guayule Resin on Natural Rubber. Rubber Chemistry and Technology. vol. 54, pp. 115-123, (1981).
McIntyre, et al., "Guayule Rubber," Handbook of Elastomers, pp. 1-27 (dated 2001).
Meeker, T.R.; Specialty Isoprene Based Polymers—Derivatives From the General Purpose Polymers; Doc. 1848; Spring 1985.
Presentation pages by Schloman, W.W., Jr. undated (submitted via third party observations in PCT/US2013/041422 on Aug. 6, 2014).
Rubber Developments vol. 39 No. 1, pp. 23-24; Your Questions Anssered (1986).
Schloman, W.W. Jr., et al., Seasonal Effects on Guayule Resin Composition, J. Agricultural and Food Chemistry, vol. 34, pp. 177-179 (1986).
Schloman, W.W. Jr. et al., Rubber Additives Derived from Guayule Resin, Industrial and Eng'r Chem. Research, vol. 27, pp. 712-716 (1988).
Schloman, W.W. Jr., et al., Guayule Byproduct Evaluation: Extract Characterization, J. Agricultural and Food Chemistry, vol. 31 pp. 873-876 (1983).
Schloman, W.W. Jr., et al., Water Stress and Seasonal Effects on Rubber Quality in Irrigated Guayule, J. Agricultural and Food Chemistry vol. 34, pp. 683-685 (1986).
Schloman, W.W. Jr., "Processing Guayule for Latex and Bulk Rubber," Industrial Crops and Products, vol. 22 No. 1, pp. 41-47, 2005.
Screw Press Operating Hints (CC Series), Vincent Corporation, accessed May 31, 2012 at http://www.vincentcorp.com/screw_press_operating_hints_%28cp%20series%29 (dated Mar. 26, 2009).
Screw Press, Wikipedia, accessed May 28, 2012 at http://wikipedia.org/wiki/screw_press.
Stillage Dewatering Screw Press, Promotional Material, FKC Co. Ltd., accessed Jul. 30, 2015 at http://www.fkescrewpress.com/docs/spentgrain_stillageflyerweb.pdf.
Van Beillen, Jan B, et al., "Guayule and Russian dandelion as alternative sources of natural rubber," CRC Critical Reviews in Biotechnology, CRC Press, vol. 27, No. 1, Jan. 2007. pp. 217-231.
Vincent Corporation, Screw Press Operating Hints, Sep. 17, 2009.
Agricultural Encyclopedia of China (Volume of Crops), vol. one, compiled by Editorial Dept. for Agricultural Encyclopedia of China, pp. 791-720, China Agricultural Press, Apr. 1991.
Australian Patent Exam Report for 2009236328 dated Jul. 2, 2013.
Second Australian Patent Exam Report 2009236328 dated Jan. 30, 2014.
Response to Australian Office Action, (dated Dec. 23, 2013).
First Office Action in Chinese Application No. 2009801224454 (dated Mar. 27, 2012).
Second Office Action in Chinese Applicaiton No. 2009801224454 (dated Jun. 27, 2012).
EP 09733501 Communication Pursuant to Article 94(3) EPC, (dated May 10, 2012).
Extended Search Report, EP 09733501 (dated Aug. 19, 2011).
Response to the Extended European Search Report dated Mar. 8, 2012.
Response to European Office Action dated Sep. 20, 2012.
Communication pursuant to Article 94(3) EPC dated Jan. 15, 2013.
Invitation pursuant to Article 94(3) and Rule 71(1) EPC dated Feb. 8, 2013.
Response to EPO dated Apr. 9, 2013.
Notification of Intent to Grant from European Patent Office dated Jun. 12, 2013.
Japanese Office Action for 2011-505140 datred Jan. 7, 2014.
Non-final Office Action issued in U.S. Appl. No. 12/937,284 on Dec. 11, 2012.
Response filed in U.S. Appl. No. 12/937,284 on Jun. 13, 2013.
Final Office Action issued in U.S. Appl. No. 12/937,284 on May 31, 2013.

(56) References Cited

OTHER PUBLICATIONS

Response filed in U.S. Appl. No. 12/937,284 on Oct. 30, 2013.
Non-final Office Action issued in U.S. Appl. No. 12/937,284 on Nov. 13, 2013.
Response filed un U.S. Appl. No. 12/937,284 on Mar. 31, 2014.
Notice of allowance issued in U.S. Appl. No. 12/937,284 on Apr. 16, 2014.
Non-final Office Action issued in U.S. Appl. No. 14/338,581 on Feb. 3, 2016.
Response filed in U.S. Appl. No. 14/338,581 on Apr. 19, 2016.
Notice of Allowance issued in U.S. Appl. No. 14/338,581 on May 2, 2016.
RCE filed on Aug. 2, 2016 in U.S. Appl. No. 14/338,581.
Notice of Allowance issued in U.S. Appl. No. 14/338,581 on Aug. 30, 2016.
Non-final office action issued in U.S. Appl. No. 15/364,527 on Feb. 13, 2018.
International Preliminary Report on Patentability and Written Opinion (corresponding PCT Application No. PCT/US2009/040543); Authorized Officer Athina Nckitas-Etienne; (8 pages) (dated Oct. 19, 2010).
International Search Report (corresponding PCT Applicaiton No. PCT/US2009/040543); Authorized Officer Kang, Hyunk Seok; (2 pages) (dated Nov. 9, 2009).
Examination report issued in application No. AU2013230936 (issued Feb. 26, 2016).
Response filed on May 16, 2016 in application No. AU2013230936.
Examination report issued in application No. AU2016222428 (issued Jan. 2017).
Response filed in Aug. 2017 in AU application No. 2016222428.
Response filed on Apr. 22, 2016 in AU application No. 2013230935.
Examination report issued in application No. AU2013230935 (issued Feb. 25, 2016).
Examination report issued in application No. AU2016213719 (issued Jan. 2017).
Response filed in application No. AU2016213719 in Mar. 2017.
Office Action issued in application No. CN2013-80021313.9 (issued on Jun. 2, 2015).
Office Action issued in application No. CN2013-80021313.9 (issued on Nov. 3, 2015).
Office Action issued in application No. CN2013-80021313.9 (issued Jan. 18, 2016).
Third Office Action issued May 2016 in CN application No. 201380023740.0.
Office Action issued in application No. CN20130023740.0 (issued May 26, 2015).
Office Action issued in application No. CN20130023740.0 (issued Dec. 16, 2015).
Fourth Office Action issued in application No. CN20130023740.0 (issued Oct. 2016).
Decision of Rejection issued in application No. CN20130023740.0 (issued in May 2017).
Supplemental European Search Report in EP national stage (EP13758291.2) from PCT/US2013/02951, dated Oct. 26, 2015.
International Preliminary Report on Patentability and Written Opinion from PCT application No. PCT/US2019/067461, dated Jun. 16, 2021, 6 pages.
International search report from PCT application No. PCT/US2019/067461, dated Apr. 6, 2020, 4 pages.
Office action issued in application CA2876958 on Jul. 17, 2020.
Response filed in application EP13806430.8 on Jan. 13, 2021.
Office action issued in application EP 13806430.8 on Sep. 30, 2020.
Non-final office action issued in U.S. Appl. No. 16/433,590 on Oct. 23, 2020.
Response filed in U.S. Appl. No. 16/433,590 on Jan. 22, 2021.
Notice of allowance issued in U.S. Appl. No. 16/433,590 on Feb. 5, 2021.
Response filed in U.S. Appl. No. 16/662,649 on Sep. 14, 2021.
Non-final Office action from U.S. Appl. No. 16/662,649, mailed Jun. 14, 2021.
Non-final Office action from U.S. Appl. No. 16/851,094, mailed Aug. 17, 2021.
Response filed in U.S. Appl. No. 16/851,094 on Nov. 17, 2021.
Office action received from EPO in EP application No. 19173187.6, mailed Jul. 2, 2021.
Response filed at EPO in EP application No. 19173187.6 Nov. 10, 2021.
Office action issued in RU application 2017140651 on Mar. 4, 2021.
Office action issued in RU application 2017130331 on Dec. 15, 2020.
Office action received from EPO in EP application 13806430.8, mailed Apr. 1, 2022.
Communication from EPO in EP application 13806430.8, mailed Aug. 3, 2022.
Response filed in EP application 13806430.8 on Oct. 11, 2022.
Non-final office action in U.S. Appl. No. 17/653,764, issued Mar. 3, 2023.
Response filed in U.S. Appl. No. 17/653,764 on May 31, 2023.
Response submitted in application No. EP13758291.2 (filed Apr. 14, 2016).
European Search Report in EP application (16205645), dated May 11, 2017.
Response submitted in application No. EP16205645 on Dec. 7, 2017.
Supplemental European Search Report in EP national stage (EP13757665.8) from PCT/US2013/029449), dated Oct. 26, 2015.
Response submitted in aplication No. EP13757665.8 (filed Apr. 14, 2016).
European Search Report and Opinion in EP application 17168837, dated Jun. 30, 2017 and May 29, 2017.
Response submitted in application No. EP 17168837.7 on Mar. 13, 2018.
Office action issued in RU application No. 2014140181 Feb. 14, 2017.
Office action issued in RU application No. 2014140183 Feb. 10, 2017.
Office action issued May 4, 2015 in U.S. Appl. No. 14/383,379.
Response filed Jul. 31, 2015 in U.S. Appl. No. 14/383,379.
Examination report issued May 2016 in AU application 2013277296.
Response submitted Jul. 7, 2016 in U.S. Appl. No. 14/383,380.
Final Office Action issued Jul. 21, 2016 in U.S. Appl. No. 14/383,380.
Office action issued Apr. 12, 2016 in U.S. Appl. No. 14/383,380.
Response submitted Sep. 1, 2016 in U.S. Appl. No. 14/383,380.
Notice of Allowance issued Dec. 27, 2017 in U.S. Appl. No. 14/383,380.
Office action issued Jul. 29, 2016 in U.S. Appl. No. 15/130,050.
Response filed Oct. 13, 2016 in U.S. Appl. No. 15/130,050.
Non-final office action rejection from U.S. Appl. No. 15/477,152 issued Jun. 28, 2017.
Response filed Sep. 28, 2017 in U.S. Appl. No. 15/477,152.
International Preliminary Report on Patentability and Written Opinion (PCT Application No. PCT/US2013/029451), dated Sep. 2, 2014.
Search Report from PCT/US2014/029451, dated Jun. 21, 2013.
International Preliminary Report on Patentability and Written Opinion (PCT Application No. PCT/US2013/029449), dated Sep. 22, 2014.
Search Report from PCT/US2014/029449, dated Jun. 21, 2013.
Examination report issued Mar. 2016 in AU application 2013262725.
Response filed in AU application 2013262725 (Aug. 10, 2016).
Second examination report issued Aug. 23, 2016 in AU application 2013262725.
Response filed in AU application 2013262725 (Sep. 12, 2016).
Examination report issued in AU application 2017200069 in Aug. 2017.
Response submitted in AU application 2017200069 in Mar. 2018.
First Office Action in Chinese application 201380031854.X (issued Sep. 11, 2015).
Second Office Action in Chinese application 201380031854.X (issued May 13, 2016).
Third Office Action in Chinese application 201380031854.X (issued Dec. 6, 2016).

(56) References Cited

OTHER PUBLICATIONS

Supplemental Search Report and opinion issue May 2016 in application EP 13792144.0.
Response filed in application EP 13792144.0 on Aug. 30, 2016.
Office action issued in RU application 2014150798 on Apr. 5, 2017.
Non-final office action from U.S. Appl. No. 14/401,749, issued Aug. 24, 2017.
Response filed in U.S. Appl. No. 14/401,749 in Nov. 2017.
International Preliminary Report on Patentability and Written Opinion from PCT/US2013/041422, dated Nov. 18, 2014.
Search Report from PCT/US2013/041422, dated Nov. 21, 2013.
Third party observations submitted in PCT/US2013/041422 on Nov. 21, 2014.
Exam Report from Australian patent application 2014210597 issued on Sep. 1, 2015.
Response filed in U.S. Appl. No. 15/498,983 on Jan. 9, 2019.
Notice of allowance from U.S. Appl. No. 15/498,983 issued Feb. 1, 2019.
Response filed in Australian patent application 2014210597 on Feb. 15, 2016.
Response filed in Australian patent application 2009236328 on Apr. 29, 2014.
Notice of allowance issued in U.S. Appl. No. 15/364,527 on Jun. 27, 2018.
Extended European Search Report and Opinion from European patent application No. 18192589.2 issued Jan. 17, 2019.
Response filed in European patent application No. 18192589.2 on Apr. 10, 2019.
Office action issued in U.S. Appl. No. 15/430,938 on Jul. 20, 2018.
Response filed in U.S. Appl. No. 15/430,938 on Dec. 20, 2018.
Response filed in European patent application 18205670.5 on Nov. 8, 2019.
Office action in Canadian patent application 2866427 issued Apr. 8, 2019.
Response filed in Canadian patent application 2866427 on Oct. 8, 2019.
Response filed in Australian patent application 2016213719 on Mar. 29, 2019.
Office action issued in Chinese patent application 2017-10590888.2 on May 5, 2018.
Notice of allowance issued in U.S. Appl. No. 15/430,938 on Jan. 22, 2019.
Notice of allowance issued in U.S. Appl. No. 15/430,938 on Feb. 21, 2019.
Examination report from application AU 2018-226498, dated Jun. 2019.
Intent to grant issued in European patent application 17168837.7 on May 29, 2018.
Intent to grant issued in European patent application 13758291 on Aug. 4, 2016.
Office action issued in Canadian patent application 2876958 on Jun. 18, 2019.
Fourth office action issued in Chinese patent application 201380032071.3 on Sep. 26, 2018.
Decision of Rejection issued in Chinese patent application 201380032071.3 on Mar. 1, 2019.
Notice of intent to grant issued in European patent application 13807847.2 on Nov. 28, 2018.
Extended European Search Report and Search Opinion issued in European patent application 19173187.6.
Office action issued in European patent application 13806430 on Dec. 20, 2018.
Response filed in European patent application 13806430 on Apr. 29, 2019.
Office action issued in U.S. Appl. No. 14/409,117 on Jun. 28, 2018.
Response and RCE filed in U.S. Appl. No. 14/409,117 on Sep. 25, 2018.
Office action issued in U.S. Appl. No. 14/409,117 on Dec. 11, 2018.
Response filed in U.S. Appl. No. 14/409,117 on Feb. 25, 2019.
Notice of allowance issued in U.S. Appl. No. 14/409,117 on Jul. 10, 2019.
Response filed in Australian patent application 2016-235014 on Apr. 22, 2018.
Response filed in U.S. Appl. No. 15/364,527 on May 14, 2018.
Office action issued in Russian patent application 2014140183 on Feb. 10, 2017.
Office action from U.S. Appl. No. 15/498,983 issued Oct. 9, 2018.
Notice of allowance from U.S. Appl. No. 15/477,152 issued Oct. 6, 2017.
Response filed in application EP 19173187.6, Apr. 2020.
Intent to grant notification from application EP 18205670.5, dated Jan. 2020.
Intent to grant notification from application EP 18192589.2, dated Nov. 25, 2019.
Response filed Jul. 1, 2016 in AU application 2013277296.
Second office action from application CN201380032071.3, issued Aug. 29, 2017.
First office action from application CN201380032071.3, issued Feb. 7, 2017.
Supplemental Search Report and opinion issued Feb. 2016 in EP application 13807874.2.
Response submitted Jul. 12, 2016 in EP application 13807874.2.
Office action issued in RU aplication 2015101234 on Mar. 29, 2017.
International Preliminary Report on Patentability and Written Opinion from PCT/US2013/046409, dated Dec. 23, 2014.
Search report from PCT/US2013/046409, dated Oct. 12, 2013.
Examination report issued May 2, 2016 in AU application 2013277335.
Response submitted Jul. 1, 2016 in AU application 2013277335.
Office action issued in application No. CN2013-80032039.5 (issued Sep. 1, 2015).
Second Office Action issued May 2016 in application No. CN2013-80032039.5.
Third Office Action issued Nov. 2016 in application No. CN2013-80032039.5.
Supplemental Search Report and opinion issued Feb. 2016 in EP application 13806430.8.
Response filed Jun. 23, 2016 in EP application 13806430.8.
Non-final rejection issued in U.S. Appl. No. 14/409,117 on Jan. 25, 2018.
Response filed in U.S. Appl. No. 14/409,117 on Apr. 25, 2018.
International Preliminary Report on Patentability and Written Opinion from PCT/US13/46328, dated Dec. 23, 2014.
Examination Report issued Feb. 2016 in AU application 2013277286.
Response filed May 2016 in AU application 2013277286.
Examination report issued Jun. 2017 in AU application 2013235014.
Office Action issued in application No. CN2013-80032056.9 (issued Sep. 6, 2015).
Second office action issued May 2016 in application No. CN2013-80032056.9.
Third office action issued in application No. CN2013-80032056.9 (issued Nov. 2016).
Supplemental Search Report and opinion issued Dec. 2015 in EP application 13807611.2.
Response filed May 19, 2016 in EP application 13807611.2.
Search report from EP application 17152493.7 issued May 2017.
Response filed in EP application 17152493.7 Oct. 16, 2017.
Office action issued in application RU2015101287, Apr. 2017.
Office action issued in application RU2015101287, Jul. 2017.
Non-final office action issued in U.S. Appl. No. 14/409,124 on Jan. 25, 2018.
Response filed in U.S. Appl. No. 14/409,124 on Apr. 25, 2018.
Search Report from PCT/US13/46380, dated Oct. 9, 2013.
International Preliminary Report on Patentability and Written Opinion from PCT/US13/46380, dated Dec. 23, 2013.
Office action from U.S. Appl. No. 14/483,455, issued Apr. 27, 2016.
Response filed in U.S. Appl. No. 14/483,455 on Aug. 26, 2016.
Final Office Action from U.S. Appl. No. 14/483,455, issued Sep. 16, 2016.
Response filed in U.S. Appl. No. 14/483,455 on Sep. 22, 2016.
Notice of allowance issued in U.S. Appl. No. 14/483,455 on Sep. 29, 2016.

(56) References Cited

OTHER PUBLICATIONS

Third party submission including statements of relevance submitted in U.S. Appl. No. 15/430,938 on Aug. 24, 2017.
International Search Report with Written Opinion from PCT Application No. PT/US2014/055086, Feb. 5, 2015.

* cited by examiner

PROCESSES FOR INCREASING THE MOLECULAR WEIGHT OF GUAYULE NATURAL RUBBER

This application is a national stage application of PCT/US2019/067461 filed on Dec. 19, 2019, which claims the benefit of U.S. Provisional Application Ser. No. 62/783,232 filed on Dec. 21, 2018, which are incorporated herein by reference in their entirety.

FIELD

The present application is directed to processes for increasing the molecular weight of guayule natural rubber that is solubilized in an organic solvent solution.

BACKGROUND

The guayule shrub provides a source of natural rubber. Process for extracting the natural rubber from its location within the cell walls of the guayule shrub may involve the use of one or more organic solvents, producing a guayule natural rubber that is solubilized in an organic solvent solution.

SUMMARY

Disclosed herein are processes for increasing the molecular weight of guayule natural rubber that is solubilized in an organic solvent solution.

According to a first embodiment, a process is disclosed for increasing the molecular weight of solubilized guayule natural rubber. The process comprises: (a) providing an organic solvent-guayule natural rubber solution comprising (i) guayule natural rubber having an initial Mw in grams/mole, and (ii) optionally guayule resin; and (b) subjecting the organic solvent-guayule natural rubber solution of (a) to shear desolventizing under conditions including at least one of (i) a temperature of about 160 to about 280° F., or (ii) a pressure of about 29 inches Hg absolute to about 0.1 inches Hg absolute or about 100 kPa absolute to about 0.3 kPa absolute, thereby producing a desolventized guayule natural rubber having 1 weight % or less organic solvent, and an Mw in grams/mole that is at least 10% higher than the initial Mw of the guayule natural rubber of (a).

According to a second embodiment, a process is disclosed for increasing the molecular weight of solubilized guayule natural rubber. The process comprises: (a) providing an organic solvent-guayule natural rubber solution comprising (i) guayule natural rubber having an initial Mw in grams/mole, and (ii) optionally guayule resin; and (b) subjecting the organic solvent-guayule natural rubber solution of (a) to shear desolventizing under conditions including at least one of (i) a temperature of about 160 to about 280° F., or (ii) a pressure of about 29 inches Hg absolute to about 0.1 inches Hg absolute or about 100 kPa absolute to about 0.3 kPa absolute, thereby producing a desolventized guayule natural rubber having 1 weight % or less organic solvent, and an Mw in grams/mole that is at least 50,000 grams/mole higher, preferably at least 100,000 grams/mole higher than the initial Mw of the guayule natural rubber of (a).

According to a third embodiment, a process is disclosed for increasing the molecular weight of solubilized guayule natural rubber. The process comprises: (a) providing an organic solvent-guayule natural rubber solution comprising (i) guayule natural rubber having an initial Mw in grams/mole, and (ii) optionally guayule resin; and (b) subjecting the organic solvent-guayule natural rubber solution of (a) to shear desolventizing using a twin screw extruder under conditions including (i) a temperature of about 160 to about 280° F., (ii) a pressure of about 29 inches Hg absolute to 0.1 inches Hg absolute or about 100 kPa absolute to about 0.3 kPa absolute, and (iii) addition of water to the twin screw extruder, thereby producing a desolventized guayule natural rubber having 1 weight % or less organic solvent, and an Mw in grams/mole that is at least 10% higher than the initial Mw of the guayule natural rubber of (a).

DETAILED DESCRIPTION

Disclosed herein are processes for increasing the molecular weight of guayule natural rubber that is solubilized in an organic solvent solution.

According to a first embodiment, a process is disclosed for increasing the molecular weight of solubilized guayule natural rubber. The process comprises: (a) providing an organic solvent-guayule natural rubber solution comprising (i) guayule natural rubber having an initial Mw in grams/mole, and (ii) optionally guayule resin; and (b) subjecting the organic solvent-guayule natural rubber solution of (a) to shear desolventizing under conditions including at least one of (i) a temperature of about 160 to about 280° F., or (ii) a pressure of about 29 inches Hg absolute to about 0.1 inches Hg absolute or about 100 kPa absolute to about 0.3 kPa absolute, thereby producing a desolventized guayule natural rubber having 1 weight % or less organic solvent, and an Mw in grams/mole that is at least 10% higher than the initial Mw of the guayule natural rubber of (a).

According to a second embodiment, a process is disclosed for increasing the molecular weight of solubilized guayule natural rubber. The process comprises: (a) providing an organic solvent-guayule natural rubber solution comprising (i) guayule natural rubber having an initial Mw in grams/mole, and (ii) optionally guayule resin; and (b) subjecting the organic solvent-guayule natural rubber solution of (a) to shear desolventizing under conditions including at least one of (i) a temperature of about 160 to about 280° F., or (ii) a pressure of about 29 inches Hg absolute to about 0.1 inches Hg absolute or about 100 kPa absolute to about 0.3 kPa absolute, thereby producing a desolventized guayule natural rubber having 1 weight % or less organic solvent, and an Mw in grams/mole that is at least 50,000 grams/mole higher, preferably at least 100,000 grams/mole higher than the initial Mw of the guayule natural rubber of (a).

According to a third embodiment, a process is disclosed for increasing the molecular weight of solubilized guayule natural rubber. The process comprises: (a) providing an organic solvent-guayule natural rubber solution comprising (i) guayule natural rubber having an initial Mw in grams/mole, and (ii) optionally guayule resin; and (b) subjecting the organic solvent-guayule natural rubber solution of (a) to shear desolventizing using a twin screw extruder under conditions including (i) a temperature of about 160 to about 280° F., (ii) a pressure of about 29 inches Hg absolute to about 0.1 inches Hg absolute or about 100 kPa absolute to about 0.3 kPa absolute, and (iii) addition of water to the twin screw extruder, thereby producing a desolventized guayule natural rubber having 1 weight % or less organic solvent, and an Mw in grams/mole that is at least 10% higher than the initial Mw of the guayule natural rubber of (a).

Definitions

The terminology as set forth herein is for description of the embodiments only and should not be construed as limiting the invention as a whole.

As used herein, the phrase guayule natural rubber refers to rubber from the guayule shrub or *Parthenium argentatum*.

As used herein, the abbreviation Mw is used for weight average molecular weight.

Organic Solvent-Guayule Natural Rubber Solution

As discussed above, according to the processes of the first-third embodiments, an organic solvent-guayule natural rubber solution is provided which comprises (i) guayule natural rubber having an initial Mw in grams/mole, and (ii) optionally guayule resin. The organic solvent-guayule natural rubber solution of the first-third embodiments can be understood as including an organic solvent component and a guayule component (including the guayule natural rubber and in some embodiments the guayule resin). In certain embodiments of the first-third embodiments, the guayule resin is present in the organic solvent-guayule natural rubber solution (in an amount as discussed further below). According to the first-third embodiments, the composition of the organic solvent component can vary, as discussed in more detail below, although it will generally include non-polar organic solvent and polar organic solvent. According to certain preferred embodiments of the first-third embodiments, the organic solvent-guayule natural rubber solution may be obtained as part of a larger process of extracting useful products (e.g., natural rubber and/or resin) from guayule shrub material using organic solvents. In other embodiments of the first-third embodiments, the organic solvent-guayule natural rubber solution may be obtained by or from other processes.

According to the first-third embodiments, the relative amounts of organic solvents, guayule natural rubber and guayule resin present in the organic solvent-guayule natural rubber solution may vary. In certain embodiments of the first-third embodiments, the organic solvent-guayule natural rubber solution comprises (includes) at least about 5 weight % guayule rubber, based upon the total weight of the organic solvent-guayule natural rubber solution. In certain embodiments of the first-third embodiments, the organic solvent-guayule natural rubber solution contains about 5 to about 40 weight % guayule rubber, 5 to 40 weight % (e.g., 5, 10, 15, 20, 25, 30, 35, or 40 weight %) guayule rubber, 10 to 40 weight %, 15 to 40 weight %, preferably 20 to 40 weight %, more preferably 25 to 40 weight % (e.g., 25, 26, 27, 28, 29, 30, 31, 32, 33, 34, 35, 36, 37, 38, 39, or 40 weight %) guayule rubber (all based upon the total weight of the organic solvent-guayule natural rubber solution). Generally, according to the first-third embodiments, the guayule natural rubber that is present in the organic solvent-guayule natural rubber solution will be solubilized in the organic solvent(s) of the solution when the solution is subjected to shear desolventizing. By solubilized is meant that a sample of the organic solvent-guayule natural rubber solution filtered through a 50 mesh filter does not filter out any guayule natural rubber.

As mentioned above, in certain embodiments of the first-third embodiments, the organic solvent-guayule natural rubber solution comprises (includes) guayule resin. In other words, in such embodiments of the first-third embodiments, the guayule resin in the organic solvent-guayule natural rubber solution is not optional. According to such embodiments, the amount of guayule resin present in the organic solvent-guayule natural rubber solution may vary. In certain embodiments of the first-third embodiments, the organic solvent-guayule natural rubber solution comprises (includes) no more than 7 weight % guayule resin (e.g., 7, 6.5, 6, 5.5, 5, 4.5, 4, 3.5, 3, 2.5, 2, 1.5, 1, 0.5, 0.25, 0.1 weight % or less guayule resin), based upon the total weight of the organic solvent-guayule natural rubber solution. In certain embodiments of the first-third embodiments, the organic solvent-guayule natural rubber solution contains no more than 6 weight %, no more than 5 weight %, no more than 4 weight %, no more than 3 weight %, preferably no more than 2.5 weight %, more preferably no more than 1.5 weight % or no more than 1 weight % guayule resin (e.g., 1 weight %, 0.5 weight %, etc.) (all based upon the total weight of the organic solvent-guayule natural rubber solution). In certain embodiments of the first-third embodiments, the organic solvent-guayule natural rubber solution contains 1 to 5 weight % guayule resin, preferably 0.5 to 2 weight % guayule resin (based upon the total weight of the organic solvent-guayule natural rubber solution. Generally, according to the first-third embodiments, the guayule resin that is present in the organic solvent-guayule natural rubber solution will be solubilized in the organic solvent(s) of the solution. By solubilized is meant that a sample of the organic solvent-guayule natural rubber solution filtered through a 50 mesh filter does not filter out any guayule resin.

According to the first-third embodiments, the molecular weight of the guayule natural rubber present in the organic solvent-guayule natural rubber solution (referred to herein as the initial Mw) may vary. The molecular weight of the guayule natural rubber present in the organic solvent-guayule natural rubber solution may be measured as a weight-average molecular weight or Mw. According to the first-third embodiments, the guayule natural rubber present in the organic solvent-guayule natural rubber solution has an initial Mw in grams/mole. The initial Mw of the guayule natural rubber present in the organic solvent-guayule natural rubber solution can vary. In other words, the organic solvent-guayule natural rubber solution used in the first-third embodiments can have a Mw that falls within a range, as discussed below. In certain embodiments of the first-third embodiments, the guayule natural rubber of the organic solvent-guayule natural rubber solution has an initial Mw of about 0.4 million to about 1.6 million grams/mole or 0.4 to 1.6 million grams/mole (e.g., 0.4 million, 0.5 million, 0.6 million, 0.7 million, 0.8 million, 0.9 million, 1 million, 1.1 million, 1.2 million, 1.3 million, 1.4 million, 1.5 million, or 1.6 million grams/mole). In certain embodiments of the first-third embodiments, the guayule natural rubber of the organic solvent-guayule natural rubber solution has an initial Mw of no more than 1 million grams/mole, preferably about 0.4 million to about 1 million grams/mole or 0.4 million to 1 million grams/mole (e.g., 0.4 million, 0.5 million, 0.6 million, 0.7 million, 0.8 million, 0.9 million, or 1 million grams/mole). In certain such embodiments of the first-third embodiments, the Mw of the desolventized guayule natural rubber is about 0.6 million to about 1.3 million or 0.6 million to 1.3 million grams/mole. In other embodiments of the first-third embodiments, the guayule natural rubber of the organic solvent-guayule natural rubber solution has an initial Mw of at least 1 million grams/mole, preferably about 1 million to about 1.6 million grams/mole or 1 million to 1.6 million grams/mole (e.g., 1 million, 1.1 million, 1.2 million, 1.3 million, 1.4 million, 1.5 million, or 1.6 million grams/mole). In certain such embodiments of the first-third embodiments, the Mw of the desolventized guayule natural rubber is about 1.1 million to about 1.9 million or 1.1 million to 1.9 million grams/mole. The initial Mw of the guayule natural rubber in the organic solvent-guayule natural rubber solution will influence the increased Mw that is achieved by subjecting the solution to shear desolventizing under the conditions described further herein. For example, subjecting an organic solvent-guayule natural rubber solution having an initial Mw of 1 million grams/mole to the same shear desolventizing conditions as an organic solvent-guayule natural rubber solution having an initial Mw of 0.6 million grams/mole will result in a desolventized guayule natural rubber having a higher Mw. The Mw numbers referred to herein are determined by GPC using a polystyrene standard.

In preferred embodiments of the first-third embodiments, the amount of any non-rubber, non-resin guayule plant matter remaining in the organic solvent-guayule natural rubber solution is very minimal, if any. In certain embodiments of the first-third embodiments, the amount of any non-rubber, non-resin guayule plant matter remaining in the organic solvent-guayule natural rubber solution is less than 1.5 ash weight % (e.g., 1.5 ash weight %, 1.2 ash weight %, 1 ash weight %, 0.8 ash weight %, 0.6 ash weight %, 0.4 ash weight %, 0.2 ash weight %, 0.1 ash weight %, or less), preferably less than 0.4 ash weight %. The ash weight % in a sample of organic solvent-guayule natural rubber solution can be determined by aching a sample in a muffle furnace. According to an exemplary procedure, a muffle furnace is pre-heated to 750° C., and a sample is then heated in a dry crucible at 750° C. for 4 hours total (1 hour covered, 3 hours uncovered). After cooling, the weight of the remaining material can be considered the ash weight.

Organic Solvents of the Organic Solvent-Guayule Natural Rubber Solution

In certain embodiments of the first-third embodiments, the organic solvent-guayule natural rubber solution comprises (includes) about 35 to about 65 weight % non-polar organic solvent, based upon the total weight of the organic solvent-guayule natural rubber solution. According to the first-third embodiments, one or more than one (e.g., two, three, four, or more) non-polar organic solvents may be utilized. In certain preferred embodiments, no more than two, preferably only one non-polar organic solvent is utilized. In certain embodiments of the first-third embodiments, the organic solvent-guayule natural rubber solution comprises (includes) 35 to 55 weight % (e.g., 35, 40, 45, 50, or 55 weight %) non-polar organic solvent(s), preferably 40 to 55 weight % (e.g., 40, 45, 50, or 55 weight %), even more preferably 45 to 55 weight % (e.g., 45, 46, 47, 48, 49, 50, 51, 52, 53, 54 or 55 weight %) non-polar organic solvent(s). As those of skill in the art can appreciate, the non-polar organic solvent(s) present in the organic solvent-guayule natural rubber solution enable the guayule natural rubber to be solubilized. In other words, the guayule rubber is soluble in the non-polar organic solvent(s) of the organic solvent-guayule natural rubber solution.

According to the first-third embodiments, the particular non-polar organic solvent(s) present in the organic solvent-guayule natural rubber solution may vary. In certain embodiments of the first-third embodiments, the organic solvent-guayule natural rubber solution includes a non-polar organic solvent selected from the group consisting of alkanes having from 4 to 9 carbon atoms; cycloalkanes and alkyl cycloalkanes having from 5 to 10 carbon atoms; aromatics and alkyl substituted aromatics having from 6 to 12 carbon atoms; and combinations thereof. According to the first-third embodiments, one or more than one (e.g., two, three, four, or more) non-polar organic solvents may be used in the solvent component of the organic solvent-guayule natural rubber solution. The alkane may be linear (e.g., n-butane, n-hexane, n-heptane, n-octane, n-nonane), branched (e.g., iso-butane, iso-hexane, iso-heptane, iso-octane, or iso-nonane), or a combination thereof. In certain preferred embodiments of the first-third embodiments, the organic solvent-guayule natural rubber solution includes a non-polar organic solvent selected from the group of alkanes (linear, branched, or a combination thereof) having 4 to 9 carbon atoms, more preferably from the group of alkanes (linear, branched, or a combination thereof) having 4 to 6 carbon atoms. In certain preferred embodiments of the first-third embodiments, the non-polar organic solvent of the organic solvent-guayule natural rubber solution comprises an alkane having 6 carbon atoms (e.g., hexane, iso-hexane, or a combination thereof); in certain such embodiments, the non-polar organic solvent of the organic solvent-guayule natural rubber solution is limited to an alkane having 6 carbon atoms (i.e., the non-polar organic solvent of the organic solvent-guayule natural rubber solution consists (only) of an alkane having 6 carbon atoms). In certain embodiments of the first-third embodiments, the non-polar organic solvent of the organic solvent-guayule natural rubber solution is selected from one of the foregoing described groups and is used in combination with a polar organic solvent selected from one of the groups described below (preferably in an amount as described below). In certain embodiments of the first-third embodiments wherein the guayule resin is either not present or present in a lower amount (e.g., 1.5 weight % or less based upon the total weight of the organic solvent-guayule natural rubber solution), the amount of non-polar solvent(s) present in the organic solvent-guayule natural rubber solution is greater than the amount of polar solvent(s) present in the organic solvent-guayule natural rubber solution.

In certain embodiments of the first-third embodiments, the organic solvent-guayule natural rubber solution comprises (includes) about 35 to about 70 weight % polar organic solvent, based upon the total weight of the organic solvent-guayule natural rubber solution. According to the first-third embodiments, one or more than one (e.g., two, three, four, or more) polar organic solvent may be utilized. In certain preferred embodiments, no more than two, preferably only one polar organic solvent is utilized. In certain embodiments of the first-third embodiments, the organic solvent-guayule natural rubber solution comprises (includes) about 40 to about 65 weight % polar organic solvents or 40 to 65 weight % polar organic solvent(s) (e.g., 40, 45, 50, 55, 60, or 65 weight %) polar organic solvent(s), preferably 45 to 55 weight % polar organic solvent(s) (e.g., 45, 46, 47, 48, 49, 50, 51, 52, 53, 54, or 55 weight % polar organic solvent(s)). As those of skill in the art can appreciate, the polar organic solvent(s) present in the organic solvent-guayule natural rubber solution enables the guayule resin to be solubilized. In other words, the guayule resin is soluble in the polar organic solvent(s) of the organic solvent-guayule natural rubber solution.

According to the first-third embodiments, the particular non-polar organic solvent(s) present in the organic solvent-guayule natural rubber solution may vary. In certain embodiments of the first-third embodiments, the organic solvent-guayule natural rubber solution includes a polar organic solvent selected from the group consisting of alcohols having 1 to 8 carbon atoms (e.g., methanol, ethanol, propanol, butanol, propanol, pentanol, hexanol, heptanol, octanol); ethers and esters having from 2 to 8 carbon atoms; cyclic ethers having from 4 to 8 carbon atoms; and ketones having from 3 to 8 carbon atoms (e.g., acetone, butanone, 2-pentanone, 3-pentanone, hexanone, etc.); and combinations thereof. According to the first-third embodiments, one or more than one (e.g., two, three, four, or more) polar organic solvent may be used in the solvent component of the organic solvent-guayule natural rubber solution. The alcohol may be linear (e.g., n-butanol) or branched (e.g., iso-butanol). The ether or ester may also be linear (e.g., diethyl ether or ethyl acetate) or branched (e.g., diisopropyl ether). In certain preferred embodiments of the first-third embodiments, the organic solvent-guayule natural rubber solution includes a polar organic solvent selected from the group of alcohols having 1 to 8 carbon atoms, ketones having from 3 to 8 carbon atoms, and combinations thereof; or more preferably from alcohols having 1 to 4 carbon atoms, ketones having from 3 to 5 carbon atoms, or combinations thereof. In other preferred embodiments of the first-third embodiments, the organic solvent-guayule natural rubber solution includes a polar organic solvent selected from ketones having 3 to 8 carbon atoms, and more preferably from ketones having 3 to 5 carbon atoms. In certain preferred embodiments of the first-third embodiments, the polar organic solvent of the organic solvent-guayule natural rubber solution comprises acetone; in certain such embodiments, the polar organic solvent of the organic solvent-guayule natural rubber solution is limited to acetone (i.e., the polar organic solvent of the organic solvent-guayule natural rubber solution consists (only) of acetone). In certain embodiments of the first-third embodiments, the polar organic solvent of the organic solvent-guayule natural rubber solution is selected from one of the foregoing described groups (i.e., in the instant paragraph) and is used in combination with a non-polar organic solvent selected from one of the groups described above. In certain preferred embodiments of the first-third embodiments, the organic solvent component of the organic solvent-guayule natural rubber solution comprises an alkane having 6 carbon atoms (as described above) as the non-polar solvent(s) and acetone as the polar solvent; in certain such embodiments, the organic solvents are limited to (i.e., consist of) a combination of an alkane having 6 carbon atoms and acetone.

Increasing the Molecular Weight of the Guayule Natural Rubber

As discussed above, according to the processes of the first-third embodiments, the molecular weight of the solubilized guayule natural rubber present in the organic solvent-guayule natural rubber solution is increased. The increase in molecular weight can be measured in various ways including, but not limited to, an increase in Mw of at least a certain % and/or an increase in Mw of at least a certain number of grams/mole.

According to the process of the first embodiment, the increase in molecular weight is measured by an increase of at least 10% (e.g., 10%, 15%, 20%, 25%, 30%, 35%, 40%, 45%, 50%, 55%, 60%, 65%, or more) in the Mw of the desolventized guayule natural rubber as compared to the initial Mw of the guayule natural rubber of the organic solvent-guayule natural rubber solution. In certain preferred embodiments of the first embodiment, the desolventized guayule natural rubber has an Mw in grams/mole that is 10 to 50% higher than the initial Mw of the guayule natural rubber of the organic solvent-guayule natural rubber. In certain embodiments of the first embodiment, the desolventized guayule natural rubber has an Mw in grams/mole that is 10-30% higher (e.g., 10%, 15%, 20%, 25%, or 30% higher) than the initial Mw of the guayule natural rubber of the organic solvent-guayule natural rubber solution. In certain embodiments of the first embodiment, the desolventized guayule natural rubber has an Mw in grams/mole that is 30-50% higher (e.g., 30%, 35%, 40%, 45%, or 50% higher) than the initial Mw of the guayule natural rubber of the organic solvent-guayule natural rubber solution. As a non-limiting example, if the desolventized guayule natural rubber has an Mw of 1.1 million grams/mole and the initial Mw of the guayule natural rubber of the organic solvent-guayule natural rubber solution was 1 million grams/mole, the increase in Mw was 10%.

According to the process of the second embodiment, the increase in molecular weight is measured by an increase of at least 50,000 grams/mole (e.g., 50,000 grams/mole; 70,000 grams/mole; 100,000 grams/mole; 150,000 grams/mole; 200,000 grams/mole; 250,000 grams/mole; 300,000 grams/mole; 350,000 grams/mole; 400,000 grams/mole; or more) in the Mw of the desolventized guayule natural rubber as compared to the initial Mw of the guayule natural rubber of the organic solvent-guayule natural rubber solution. In preferred embodiments of the second embodiment, the desolventized guayule natural rubber has an Mw that is at least 100,000 grams/mole higher (e.g., 100,000 grams/mole higher; 125,000 grams/mole higher; 150,000 grams/mole higher; 175,000 grams/mole higher; 200,000 grams/mole higher; 225,000 grams/mole higher; 250,000 grams/mole higher; 275,000 grams/mole higher; 300,000 grams/mole higher; 325,000 grams/mole higher; 350,000 grams/mole higher; 375,000 grams/mole higher; 400,000 grams/mole higher; or more) than the initial Mw of the guayule natural rubber of the organic solvent-guayule natural rubber solution. In certain such embodiments, the desolventized guayule natural rubber has a Mw that is 100,000 to 400,000 grams/mole higher, 200,000 to 400,000 grams/mole higher, or 200,000 to 350,000 grams/mole higher than the initial Mw of the guayule natural rubber of the organic solvent-guayule natural rubber solution. As a non-limiting example, if the desolventized guayule natural rubber has an Mw of 1.2 million grams/mole and the initial Mw of the guayule natural rubber of the organic solvent-guayule natural rubber solution was 1 million grams/mole, the increase in Mw was 200,000 grams/mole. In certain embodiments of the second embodiment, in addition to meeting the Mw increase as described above (e.g., at least 50,000 grams/mole, preferably at least 100,000 grams/mole, or higher), the increase in molecular weight is also at least 10% (e.g., 10%, 15%, 20%, 25%, 30%, 35%, 40%, 45%, 50%, 55%, 60%, 65%, or more) as compared to the initial Mw of the guayule natural rubber of the organic solvent-guayule natural rubber solution. In certain embodiments of the second embodiment, in addition to meeting the Mw increase as described above (e.g., at least 50,000 grams/mole, preferably at least 100,000 grams/mole, or higher), the increase in molecular weight is 10 to 50% higher than the initial Mw of the guayule natural rubber of the organic solvent-guayule natural rubber. In certain embodiments of the second embodiment, in addition to meeting the Mw increase as described above (e.g., at least 50,000 grams/mole, preferably at least 100,000 grams/mole, or higher), the increase in molecular weight is the desolventized guayule natural rubber has an Mw in grams/mole that is 10-30% higher (e.g., 10%, 15%, 20%, 25%, or 30% higher) than the initial Mw of the guayule natural rubber of the organic solvent-guayule natural rubber solution. In certain embodiments of the second embodiment, in addition to meeting the Mw increase as described above (e.g., at least 50,000 grams/mole, preferably at least 100,000 grams/mole, or higher), the molecular weight is 30-50% higher (e.g., 30%, 35%, 40%, 45%, or 50% higher) than the initial Mw of the guayule natural rubber of the organic solvent-guayule natural rubber solution.

According to the process of the third embodiment, the increase in molecular weight is measured by an increase of at least 10% (e.g., 10%, 15%, 20%, 25%, 30%, 35%, 40%, 45%, 50%, 55%, 60%, 65%, or more) in the Mw of the desolventized guayule natural rubber as compared to the initial Mw of the guayule natural rubber of the organic solvent-guayule natural rubber solution. In certain preferred embodiments of the third embodiment, the desolventized guayule natural rubber has an Mw in grams/mole that is 10 to 50% higher than the initial Mw of the guayule natural rubber of the organic solvent-guayule natural rubber. In certain embodiments of the first-third embodiments, the desolventized guayule natural rubber has an Mw in grams/mole that is 10-30% higher (e.g., 10%, 15%, 20%, 25%, or 30% higher) than the initial Mw of the guayule natural rubber of the organic solvent-guayule natural rubber solution. In certain embodiments of the third embodiment, the desolventized guayule natural rubber has an Mw in grams/mole that is 30-50% higher (e.g., 30%, 35%, 40%, 45%, or 50% higher) than the initial Mw of the guayule natural rubber of the organic solvent-guayule natural rubber solution. As a non-limiting example, if the desolventized guayule natural rubber has an Mw of 1.1 million grams/mole and the initial Mw of the guayule natural rubber of the organic solvent-guayule natural rubber solution was 1 million grams/mole, the increase in Mw was 10%.

Shear Desolventizing

According to the processes of the first-third embodiments, the organic solvent-guayule natural rubber solution is subjected to shear desolventizing under conditions including at least one of (i) a temperature of about 160 to about 280° F. (or about 70 to about 140° C.), or (ii) a pressure of about 29 inches Hg absolute to 0.1 inches Hg absolute (or about 100 kPa absolute to 0.3 kPa absolute). In certain embodiments of the first-third embodiments, both (i) and (ii) are met. In certain embodiments of the first-third embodiments, the shear desolventizing is conducted at a temperature of 160 to 280° F. (e.g., 160, 170, 180, 190, 200, 210, 220, 230, 240, 250, 260, 270, or 280° F.), preferably 210 to 270° F. (e.g., 210, 220, 230, 240, 250, 260, or 270° F.) or 70 to 140° C. (e.g., 70, 75, 80, 85, 90, 95, 100, 105, 110, 115, 120, 125, 130, 135, or 140° C.), preferably 100 to 130° C. (e.g., 100, 105, 110, 115, 120, 125, or 130° C.). In certain such embodiments, the shear desolventizing is also conducted at a pressure of 29 to 0.1 inches Hg absolute (e.g., 29, 28, 27, 26, 25, 24, 23, 22, 21, 20, 19, 18, 17, 16, 15, 14, 13, 12, 11, 10, 9, 8, 7, 6, 5, 4, 3, 2, 1, 0.5, or 0.1 inches Hg absolute), preferably 22 to 0.5 inches Hg absolute (e.g., 22, 21, 20, 19, 18, 17, 16, 15, 14, 13, 12, 11, 10, 9, 8, 7, 6, 5, 4, 3, 2, 1, 0.5, or 0.1 inches Hg absolute), or 100 to 0.3 kPa absolute (e.g., 100, 95, 90, 85, 80, 75, 70, 65, 60, 55, 50, 45, 40, 35, 30, 25, 20, 15, 10, 5, 4, 2, 1, 0.5, or 0.3 kPa absolute), preferably 75 to 0.3 kPa absolute (e.g., 75, 70, 65, 60, 55, 50, 45, 40, 35, 30, 25, 20, 15, 10, 5, 4, 2, 1, 0.5 or 0.3 kPa absolute). In certain embodiments of the first-third embodiments, the shear desolventizing is conducted at a pressure of 29 to 0.1 inches Hg absolute (e.g., 29, 28, 27, 26, 25, 24, 23, 22, 21, 20, 19, 18, 17, 16, 15, 14, 13, 12, 11, 10, 9, 8, 7, 6, 5, 4, 3, 2, 1, 0.5, or 0.1 inches Hg absolute), preferably 22 to 0.5 inches Hg absolute or 100 to 0.3 kPa absolute (e.g., 100, 95, 90, 85, 80, 75, 70, 65, 60, 55, 50, 45, 40, 35, 30, 25, 20, 15, 10, 5, 4, 2, 1, 0.5, or 0.3 kPa absolute), preferably 75 to 0.3 kPa absolute (e.g., 75, 70, 65, 60, 55, 50, 45, 40, 35, 30, 25, 20, 15, 10, 5, 4, 2, 1, 0.5 or 0.3 kPa absolute). In certain such embodiments, the shear desolventizing is also conducted at a temperature of 160 to 280° F., preferably 210 to 270° F. or 70 to 140° C., preferably 100 to 130° C. In certain preferred embodiments of the first-third embodiments, wherein a screw extruder is utilized for shear desolventizing, the pressure along the length of the extruder decreases from inlet to outlet, preferably within one of the foregoing ranges. In other words, in such embodiments the amount of vacuum present increases along the length of the extruder.

In certain embodiments of the first-third embodiments, the shear desolventizing includes addition of water. In other words, in such embodiments, a quantity of water is added as part of the shear desolventizing step. According to the first-third embodiments, when the shear desolventizing includes addition of water, the quantity of water that is added may vary. In certain embodiments of the first-third embodiments, the shear desolventizing includes addition of water in a weight amount of 0.05:1 to 0.5:1 (e.g., 0.05:1, 0.06:1, 0.07:1, 0.08:1, 0.09:1, 0.1:1, 0.15:1, 0.2:1, 0.25:1, 0.3:1, 0.35:1, 0.4:1, 0.45:1, or 0.5:1), preferably 0.05:1 to 0.4:1, more preferably 0.05:1 to 0.35:1 based upon the amount of guayule rubber present in the organic solvent-guayule natural rubber solution. Although water may be utilized in the shear desolventizing according to the first-third embodiments, the amount of water present in the desolventized natural rubber that is produced is minimized. In preferred embodiments of the first-third embodiments, the guayule natural rubber that results from the shear desolventizing has a water content of no more than 1 weight % (e.g., 1, 0.9, 0.8, 0.7, 0.6, 0.5, 0.4, 0.3, 0.2, 0.1, 0.5, 0.4, 0.3, 0.2, or 0.1 weight %), preferably no more than 0.5 weight %, even more preferably no more than 0.25 weight %.

In certain embodiments of the first-third embodiments wherein the shear desolventizing includes addition of water, the water meets at least one of the following: (a) has a total dissolved solids content of no more than 300 ppm (e.g., 300 ppm, 280 ppm, 260 ppm, 240 ppm, 220 ppm, 200 ppm, 180 ppm, 160 ppm, 140 ppm, 120 ppm, 100 ppm, 80 ppm, 60 ppm, or less), preferably no more than 150 ppm (e.g., 150 ppm, 130 ppm, 110 ppm, 90 ppm, 70 ppm, 50 ppm, or less); or (b) is at a temperature of about 75 to about 110 ° F. or 75-110° F. (e.g., 75, 80, 85, 90, 95, 100, 105, or 110° F.) before addition. In certain such embodiments, at least one of (a) and (b) is met and the amount of water added is within the ranges described in the preceding paragraph. In certain embodiments of the first-third embodiments, both of (a) and (b) are met, optionally in combination with the use of an amount of water within the ranges described in the preceding paragraph. The total dissolved solids values set forth herein can be determined using Method 2540C ($23^{rd}$ edition) as published by the Standard Methods Committee for determination of total dissolved solids in water by drying at 180° C.

Generally, according to the processes of the first-third embodiments, the shear desolventizing not only removes organic solvents from the organic solvent-guayule natural rubber solution but also applies shear to the solution. Since the organic solvent-guayule natural rubber solution can be considered to be a liquid, the shear results from the particles in the solution (or layers of the solution) moving relative to one another.

According to the processes of the first-third embodiments, shear desolventizing can be achieved using various equipment. In certain embodiments of the first-third embodiments, the shear desolventizing includes the use of a screw extruder, preferably a twin screw (or double screw) extruder. In preferred embodiments of the first-third embodiments wherein a twin (or double screw) extruder is utilized, both screws turn in the same direction. Generally, a screw extruder consists of a barrel-like cavity containing a rotating internal screw (or screw) having flanges designed or configured to move a contents forward upon rotation of the screw. In certain embodiments of the first-third embodiment, the screw extruder includes one or more (e.g., two, three, four, five, six, or more) injection ports each allowing for addition of a substance to the interior cavity of the screw extruder. In certain preferred embodiments of the first-third embodiments, the screw extruder includes three to six injection ports spaced along the length of the barrel of the extruder. In certain preferred embodiments of the first-third embodiments, the shear desolventizing includes use of a twin screw extruder having at least three injection ports spaced along the length of the barrel of the extruder and water is added via at least one injection port. The length of the barrel can be considered to be n meters and the length can be divided into two halves each of n/2 meter. In certain such embodiments, the water is added via an injection port positioned in the first half of the length of the barrel of the extruder. In other such embodiments, the water is added via an injection port position in the second half of the length of the barrel of the extruder. In certain preferred embodiments of the first-third embodiments, the extruder has at least one vent (which can aid in solvent removal) positioned along the length of the barrel. In certain such embodiments two vents, three vents, four vents, or more can be present. In preferred embodiments of the first-third embodiments, the extruder includes a combination of at least one vent (as discussed above) with one or more injection ports (as also discussed above).

In certain embodiments of the first-third embodiments wherein the shear desolventizing involves use of a screw extruder or a twin screw extruder, each screw rotates at a speed of at least 20 rpm (e.g, 20, 30, 40, 50, 60, 70, 80, 90, 100, 110 rpm or more), preferably 30 to 100 rpm (e.g., 30, 35, 40, 45, 50, 55, 60, 65, 70, 75, 80, 85, 90, 95 or 100 rpm). In certain such embodiments, the shear desolventizing also takes place at a temperature and pressure as discussed above. In certain embodiments of the first-third embodiments wherein the shear desolventizing involves use of a screw extruder or a twin screw extruder, the organic solvent-guayule natural rubber solution resides in the extruder for at least 1 minute (e.g., 1, 2, 3, 4, 5, 6, 7, 8, 9, 10, 15, 30 minutes or more), preferably 1 to 10 minutes. In certain such embodiments, the extruder rotates at one of the foregoing speeds and the shear desolventizing also takes place at a temperature and pressure as discussed above. In certain embodiments of the first-third embodiments wherein the shear desolventizing involves use of a screw extruder In other embodiments of the first-third embodiments, the shear desolventizing makes use of other equipment to achieve the shear desolventizing.

This application discloses several numerical range limitations that support any range within the disclosed numerical ranges, even though a precise range limitation is not stated verbatim in the specification, because the embodiments of the compositions and methods disclosed herein could be practiced throughout the disclosed numerical ranges. With respect to the use of substantially any plural or singular terms herein, those having skill in the art can translate from the plural to the singular or from the singular to the plural as is appropriate to the context or application. The various singular or plural permutations may be expressly set forth herein for sake of clarity.

It will be understood by those within the art that, in general, terms used herein, and especially in the appended claims are generally intended as "open" terms. For example, the term "including" should be interpreted as "including but not limited to," the term "having" should be interpreted as "having at least," the term "includes" should be interpreted as "includes but is not limited to." It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All references, including but not limited to patents, patent applications, and non-patent literature are hereby incorporated by reference herein in their entirety.

While various aspects and embodiments of the compositions and methods have been disclosed herein, other aspects and embodiments will be apparent to those skilled in the art. The various aspects and embodiments disclosed herein are for purposes of illustration and are not intended to be limiting, with the true scope and spirit being indicated by the claims.

What is claimed is:

1. A process for increasing the molecular weight of solubilized guayule natural rubber comprising
  a. providing an organic solvent-guayule natural rubber solution comprising (i) guayule natural rubber having an initial Mw in grams/mole, and (ii) optionally guayule resin, wherein the organic solvent-guayule natural rubber solution of (a) includes about 5 to about 40 weight % guayule natural rubber, based upon the total weight of the organic solvent-guayule natural rubber solution; and
  b. subjecting the organic solvent-guayule natural rubber solution of (a) to shear desolventizing under conditions including at least one of (i) a temperature of about 160 to about 280° F., or (ii) a pressure of about 29 inches Hg absolute to about 0.1 inches Hg absolute or about 100 kPa absolute to about 0.3 kPa absolute, thereby producing a desolventized guayule natural rubber having 1 weight % or less organic solvent, and an Mw in grams/mole that is at least 10% higher than the initial Mw.

2. The process of claim 1, wherein the shear desolventizing uses a twin screw extruder.

3. A process for increasing the molecular weight of solubilized guayule natural rubber comprising:
   a. providing an organic solvent-guayule natural rubber solution comprising (i) guayule natural rubber having an initial Mw in grams/mole, and (ii) optionally guayule resin, wherein the organic solvent-guayule natural rubber solution of (a) includes about 5 to about 40 weight % guayule natural rubber, based upon the total weight of the organic solvent-guayule natural rubber solution; and
   b. subjecting the organic solvent-guayule natural rubber solution of (a) to shear desolventizing under conditions including at least one of (i) a temperature of about 160 to about 280° F., or (ii) a pressure of about 29 inches Hg absolute to about 0.1 inches Hg absolute or about 100 kPa absolute to about 0.3 kPa absolute, thereby producing a desolventized guayule natural rubber having 1 weight % or less organic solvent, and an Mw in grams/mole that is at least 50,000 grams/mole higher than the initial Mw of the guayule natural rubber of (a).

4. The process of claim 1, wherein the desolventized guayule natural rubber has an Mw in grams/mole that is 10-50% higher than the initial Mw.

5. The process of claim 1, wherein the initial Mw of the guayule natural rubber of (a) is about 0.4 million to about 1.6 million grams/mole.

6. The process of claim 1, wherein the initial Mw of the guayule natural rubber of (a) is about 0.4 million to about 1 million grams/mole.

7. The process of claim 5, wherein the initial Mw of the guayule natural rubber of (a) is about 1 million to about 1.6 million grams/mole.

8. The process of claim 5, wherein the Mw of the desolventized natural rubber is about 0.6 million to about 1.3 million grams/mole.

9. The process of claim 4, wherein the Mw of the desolventized natural rubber is about 1.1 million to about 1.9 million grams/mole.

10. The process claim 1, wherein the organic solvent-guayule natural rubber solution of (a) includes no more than 7 weight % of guayule resin, based upon the total weight of the organic solvent-guayule natural rubber solution.

11. The process of claim 1, wherein the organic solvent-guayule natural rubber solution of (a) includes about 20 to about 40 weight % guayule natural rubber, based upon the total weight of the organic solvent-guayule natural rubber solution.

12. The process of claim 1, wherein the organic solvent-guayule natural rubber solution of (a) includes about 35 to about 55 weight % non-polar organic solvent, based upon the total weight of the organic solvent-guayule natural rubber solution.

13. The process of claim 12, wherein the non-polar organic solvent is selected from the group consisting of alkanes having from 4 to 9 carbon atoms; cycloalkanes and alkyl cycloalkanes having from 5 to 10 carbon atoms; aromatics and alkyl substituted aromatics having from 6 to 12 carbon atoms; and combinations thereof.

14. The process of claim 1, wherein the organic solvent solution of (a) includes (i) about 40 to about 65 weight % polar organic solvent, based upon the total weight of the organic solvent solution.

15. The process of claim 14, wherein the polar organic solvent is selected from the group consisting of alcohols having 1 to 8 carbon atoms; ethers and esters having from 2 to 8 carbon atoms; cyclic ethers having from 4 to 8 carbon atoms; and ketones having from 3 to 8 carbon atoms; and combinations thereof.

16. The process of claim 1, wherein the organic solvent-guayule natural rubber solution comprises 35-55 weight % of one or more alkanes having 6 carbon atoms and 40-65 weight % of acetone.

17. The process of claim 1, wherein the shear desolventizing includes addition of water in a weight amount of 0.05:1 to 0.5:1, based upon the amount of guayule rubber present in the organic solvent-guayule natural rubber solution of (a).

18. The process of claim 17, wherein the water meets at least one of the following:
   a. has a total dissolved solids content of no more than 300 ppm; or
   b. is at a temperature of about 75 to about 110° F. before addition.

19. The process of claim 1, wherein the temperature (i) during shear desolventizing is about 200 to about 230° F.

20. The process of claim 17, wherein the shear desolventizing includes use of a twin screw extruder having a length and at least 3 injection ports spaced along the length, and the water is added via an injection port.

21. The process of claim 1, wherein the shear desolventizing includes use of a twin screw extruder having at least one injection port.

* * * * *